US008188826B2

(12) United States Patent
Okada et al.

(10) Patent No.: US 8,188,826 B2
(45) Date of Patent: May 29, 2012

(54) COIL UNIT AND ELECTRONIC APPARATUS USING THE SAME

(75) Inventors: Hirofumi Okada, Suwa (JP); Yoichiro Kondo, Chino (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

(21) Appl. No.: 12/429,781

(22) Filed: Apr. 24, 2009

(65) Prior Publication Data

US 2009/0284341 A1    Nov. 19, 2009

(30) Foreign Application Priority Data

May 14, 2008    (JP) ................................ 2008-126747

(51) Int. Cl.
*H01F 5/00*   (2006.01)
*H01F 27/29*  (2006.01)
*H01F 27/28*  (2006.01)

(52) U.S. Cl. .......................... 336/200; 336/192; 336/232

(58) Field of Classification Search ................... 336/200, 336/223, 107, 192, 222, 232

See application file for complete search history.

(56) References Cited

U.S. PATENT DOCUMENTS

| | | | | |
|---|---|---|---|---|
| 2,008,622 A | * | 7/1935 | McClure | 200/61.26 |
| 2,137,392 A | * | 11/1938 | Cobb | 336/135 |
| 2,584,592 A | * | 2/1952 | Kehbel | 334/6 |
| 3,403,298 A | * | 9/1968 | Richards et al. | 336/65 |
| 4,777,436 A | * | 10/1988 | Fiori, Jr. | 324/207.17 |
| 5,111,169 A | * | 5/1992 | Ikeda | 333/181 |
| 6,603,382 B1 | * | 8/2003 | Komai et al. | 336/200 |
| 2003/0095027 A1 | * | 5/2003 | Shu Yuen Hui et al. | 336/200 |
| 2007/0230221 A1 | * | 10/2007 | Lim et al. | 363/16 |
| 2008/0164840 A1 | * | 7/2008 | Kato et al. | 320/108 |
| 2008/0278275 A1 | * | 11/2008 | Fouquet et al. | 336/84 M |

FOREIGN PATENT DOCUMENTS

| | | |
|---|---|---|
| JP | U-3-90371 | 9/1991 |
| JP | A-2000-269059 | 9/2000 |
| JP | A-2001-258182 | 9/2001 |
| JP | A-2003-045731 | 2/2003 |
| JP | A-2004-47700 | 2/2004 |
| JP | A-2004-296981 | 10/2004 |
| JP | A-2006-311712 | 11/2006 |
| JP | A-2008-172872 | 7/2008 |
| JP | A-2008-205214 | 9/2008 |
| JP | A-2008-235862 | 10/2008 |

* cited by examiner

*Primary Examiner* — Anh Mai
*Assistant Examiner* — Mangtin Lian
(74) *Attorney, Agent, or Firm* — Oliff & Berridge, PLC

(57) ABSTRACT

A coil unit includes a coil formed by winding a coil wire, a wiring substrate, and a magnetic substance for receiving magnetic lines of force generated by the coil. The wiring substrate includes a connection terminal connected to both ends of the coil, an external connection terminal, and a wiring pattern for connecting the connection terminal and the external connection terminal. No circuit element other than the coil is mounted on the wiring substrate.

12 Claims, 13 Drawing Sheets

| UNIT No. | MAGNETIC SHEET61 | MAGNETIC SHEET62 | INDUCTANCE ($\mu$H) | RESIST-ANCE [$\Omega$] | Q |
|---|---|---|---|---|---|
| (1) | A | – | 10.131 | 0.318 | 20.01728 |
| (2) | A | A | 10.740 | 0.309 | 21.83864 |
| (3) | B | – | 11.392 | 0.382 | 18.73771 |
| (4) | B | B | 11.345 | 0.379 | 18.80811 |
| (5) | A | B | 11.168 | 0.343 | 20.45790 |
| (6) | B | A | 11.461 | 0.392 | 18.37030 |

FIG.10

COIL UNIT AND ELECTRONIC APPARATUS USING THE SAME

BACKGROUND

1. Technical Field

Several aspects of the present invention relates to a coil unit suitable for contactless power transmission and an electronic apparatus or the like using the coil unit.

2. Related Art

There is known contactless power transmission that uses electromagnetic induction to transmit power without using a metal contact. As applications of contactless power transmission, charging of a cell phone, charging of a home appliance (e.g., a handset), and the like have been proposed.

In recent years, cell phones are required to be downsized further. For this reason, a coil unit for transmitting power must also be further downsized, particularly, in the thickness dimension. For the purpose of providing a battery pack interface whose use allows charging a cell phone including a battery pack by only placing the cell phone on a power transmission apparatus, JP-A-2006-311712 discloses a technology for transmitting power to a cell phone (1) including a battery pack (3) storing a protection circuit (5) and a secondary battery (4) and a charging control circuit (6) via contact terminals (9) and (10) using a battery pack lid (2) including a power transmission interface (8) and a rectifier circuit (7).

In JP-A-2006-311712, a coil serving as the power transmission interface (8) is included in the battery pack lid (2) together with the rectifier circuit (7). The inclusion of the rectifier circuit (7) makes the battery pack lid (2) thicker. Also, the battery pack lid (2) is available only as a battery pack; therefore, its use condition, that is, its flexibility in usage is significantly restricted.

SUMMARY

An advantage of an aspect of the invention is to provide a coil unit that has greater flexibility in its insertion position in an electronic apparatus, insertion space, and insertion method, and an electronic apparatus using the coil unit.

A coil unit according to an aspect of the invention includes a coil formed by winding a coil wire, a wiring substrate, and a magnetic substance for receiving magnetic lines of force generated by the coil. The wiring substrate includes a connection terminal connected to both ends of the coil, an external connection terminal, and a wiring pattern for connecting the connection terminal and the external connection terminal. No circuit element other than the coil is mounted on the wiring substrate.

The coil unit according to the aspect of the invention is separated from a coil control unit. This coil unit is coupled to the coil control unit via the external connection terminal. Since the minimum elements of the coil unit are the coil, wiring substrate, and magnetic substance, the coil unit is downsized or slimmed down. Thus, the coil unit has greater flexibility in its insertion position in an electronic apparatus, insertion space, and insertion method. Depending on the materials of the coil and magnetic substance, it is difficult to maintain the shape of the coil unit with only the coil and magnetic substance; however, integration with the wiring substrate, which is a rigid body, allows the coil unit to maintain its shape.

In the aspect of the invention, the coil may be a flat coil. A flat coil may be formed by winding a coil wire around the magnetic substance using the magnetic substance as the core or may be an air-core coil formed by winding a coil wire on a plane in a spiral fashion. Use of a flat coil further ensures slimming down of the coil unit.

In the aspect of the invention, the wiring substrate may have a coil housing, and the coil may be housed in the coil housing. Thus, a part or all of the thickness of the coil is absorbed by the thickness of the substrate. This further ensures slimming down of the coil unit.

In the aspect of the invention, the coil may be an air-core coil formed by winding the coil wire on a plane, and the inner terminal of the coil wire may be drawn from the non-transmission surface of the coil.

This prevents the coil inner end drawing line from forming protrusions on the transmission surface. This makes the transmission surface flat, thereby reducing the distance between the transmission surface of the primary coil and that of the secondary coil. As a result, the transmission efficiency is improved.

In the aspect of the invention, the coil unit may further include a spacer disposed between the non-transmission surface of the coil and the magnetic substance. Thus, even if the magnetic substance is not flexible, recesses and protrusions formed on the non-transmission surface of the coil by the coil inner end drawing line are absorbed by the spacer.

In the aspect of the invention, the magnetic substance may be a multilayer body where a plurality of magnetic substances are layered. The respective magnetic substances may be an identical type of magnetic substances or different types of magnetic substances. If the magnetic substance is a multilayer body where a plurality of magnetic substances are layered, coil characteristics (inductance, resistance, Q value, or the like) that cannot be obtained with a single magnetic substance are obtained. Also, since magnetic lines of force magnetic lines of force are confined within a magnetic path formed by the two magnetic substances, leakage magnetic flux is reduced. Therefore, a shield plate does not always need to be provided. This slims down the coil unit.

The coil magnetic substance may include first and second magnetic substances having different characteristics, particularly, different magnetic permeabilities. Combination of two magnetic substances having different characteristics allows obtaining coil characteristics (inductance, resistance, Q value, or the like) that cannot be obtained with a single magnetic substance or a multilayer body where an identical type of magnetic substances are layered. Also, since magnetic lines of forcemagnetic lines of force are confined within a magnetic path formed by the two magnetic substances, leakage magnetic flux is reduced. Therefore, a shield plate does not always need to be provided. This slims down the coil unit.

In the aspect of the invention, the equivalent resistance of the coil at the time when the first magnetic substance is used as the magnetic path may be smaller than the equivalent resistance of the coil at the time when the second magnetic substance is used as the magnetic path, and the inductance of the coil at the time when the first magnetic substance is used as the magnetic path may be smaller than the inductance of the coil at the time when the second magnetic substance is used as the magnetic path. This allows obtaining a coil having a characteristic range that cannot be obtained with a coil unit where only one of the two magnetic substances is used in a single layer or multiple layers.

In the aspect of the invention, the first magnetic substance may be disposed between the coil wire and the second magnetic substance. By disposing the first magnetic substance, which can reduce the equivalent resistance, near the coil wire, the transmission efficiency is improved.

In the aspect of the invention, the coil unit may further include a temperature detection element and a flexible substrate on which the temperature detection element is mounted. The flexible substrate may be interposed between the coil wire and the magnetic substance.

Thus, the coil unit is slimmed down while the temperature detection element is disposed in any position adjacent to the coil. If an air-core coil is used as the coil, the temperature detection element may be disposed in the air-core of the coil. If a foreign object intrudes into the air-core having a high magnetic flux density of the air-core coil, heating caused by an eddy current generated by the foreign object becomes extremely significant. The temperature of the foreign object or that of the coil is detected using the temperature detection element, such as a thermistor, that is mounted on the flexible substrate and disposed in the air-core of the air-core coil.

An electronic apparatus according to another aspect of the invention includes an insertion part into which the above-mentioned coil unit is to be inserted and a main body terminal to be connected to the external connection terminal of the coil unit. Since the coil unit is downsized or slimmed down, it has greater flexibility in its insertion position in the insertion part of the electronic apparatus and in its insertion space. Also, the coil unit has greater flexibility in its insertion method such as slot-in or insertion into a lid such as a battery lid.

BRIEF DESCRIPTION OF THE DRAWINGS

The invention will be described with reference to the accompanying drawings, wherein like reference numerals represent like elements.

FIG. 10 is a table where values at a frequency of 100,000 Hz extracted from characteristics shown in the above-mentioned graphs are organized.

DESCRIPTION OF EXEMPLARY EMBODIMENT

Now, a preferred embodiment of the invention will be described in detail. The embodiment described below does not unduly limit the invention as set forth in the appended claims. Also, not all the configurations described in the embodiment are essential as means for solving the above-mentioned problems.

1. Charging System

Figure 1:
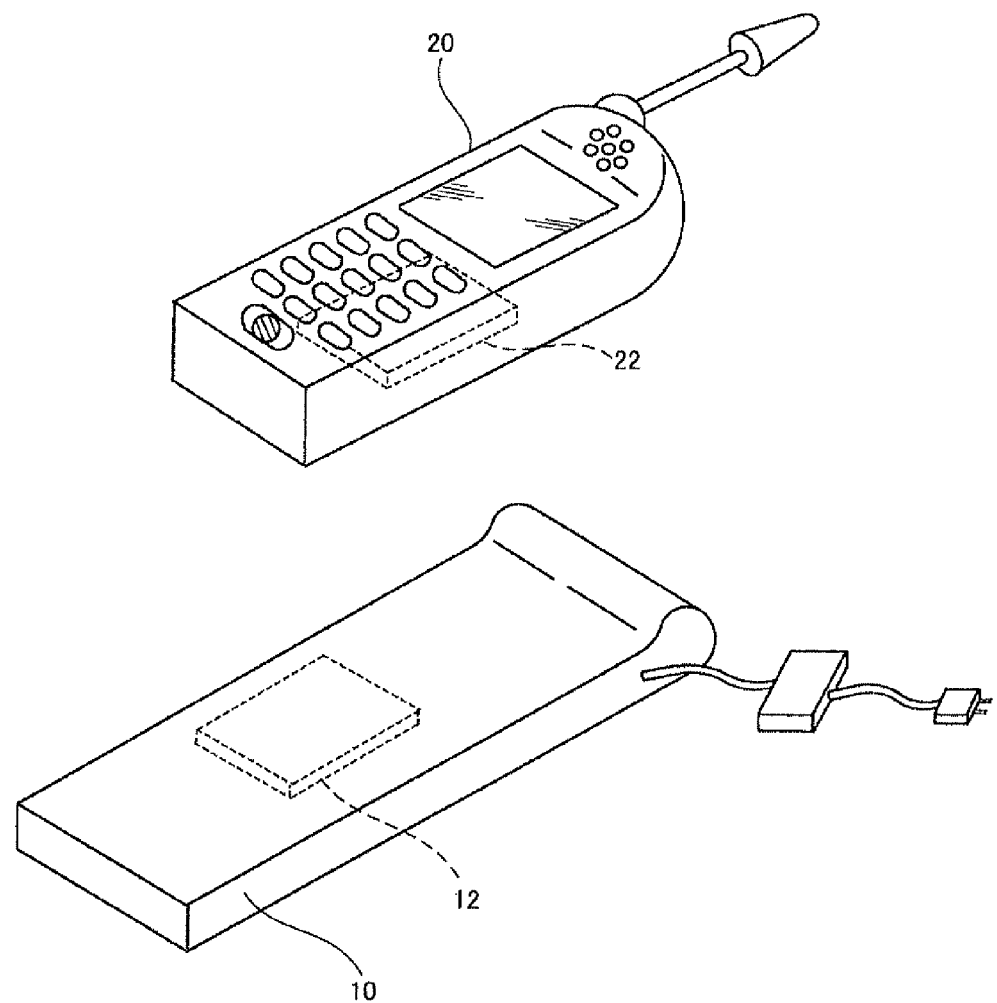
FIG. 1 is a drawing schematically showing a charger and an electronic apparatus charged by the charger, such as a cell phone.

FIG. 1 is a drawing schematically showing a charger 10, which is also an example of an electronic apparatus, and a cell phone 20, which is an example of an electronic apparatus changed by the charger 10. FIG. 1 shows the cell phone 20 to be transversely placed on the charger 10. The cell phone 20 is charged by the charger 10 by means of contactless power transmission using an electromagnetic induction action generated between a coil of a coil unit 12 of the charger 10 and a coil of a coil unit 22 of the cell phone 20.

The charger 10 and cell phone 20 may each have a positioning structure. For example, the charger 10 may have a positioning protrusion protruding out of the outer surface of the case thereof. On the other hand, the cell phone 20 may have a positioning recess on the outer surface of the case thereof. By using such positioning structures, the coil unit 22 of the cell phone 20 is at least disposed in a position opposed to the coil unit 12 of the charger 10.

Figure 2:
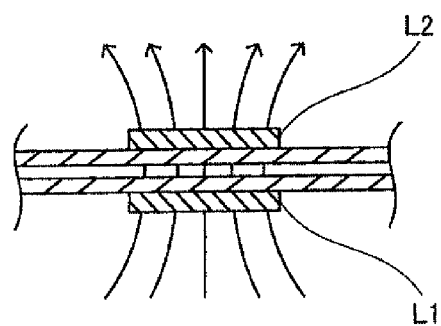
FIG. 2 is a drawing showing an example of a contactless power transmission method.

As schematically shown in FIG. 2, power is transmitted from the charger 10 to the cell phone 20 by electromagnetically coupling a primary coil L1 (power transmission coil) included in the charger 10 and a secondary coil L2 (power reception coil) included in the cell phone 20 and thus forming a power transmission transformer. This realizes contactless power transmission. Note that FIG. 2 shows an example of electromagnetic coupling between the primary coil L1 and secondary coil L2 and that another type of electromagnetic coupling where magnetic lines of forcemagnetic lines of force are formed in a way different from that in FIG. 2 may be adopted.

2. Coil Unit of Cell Phone 20

Figure 3:
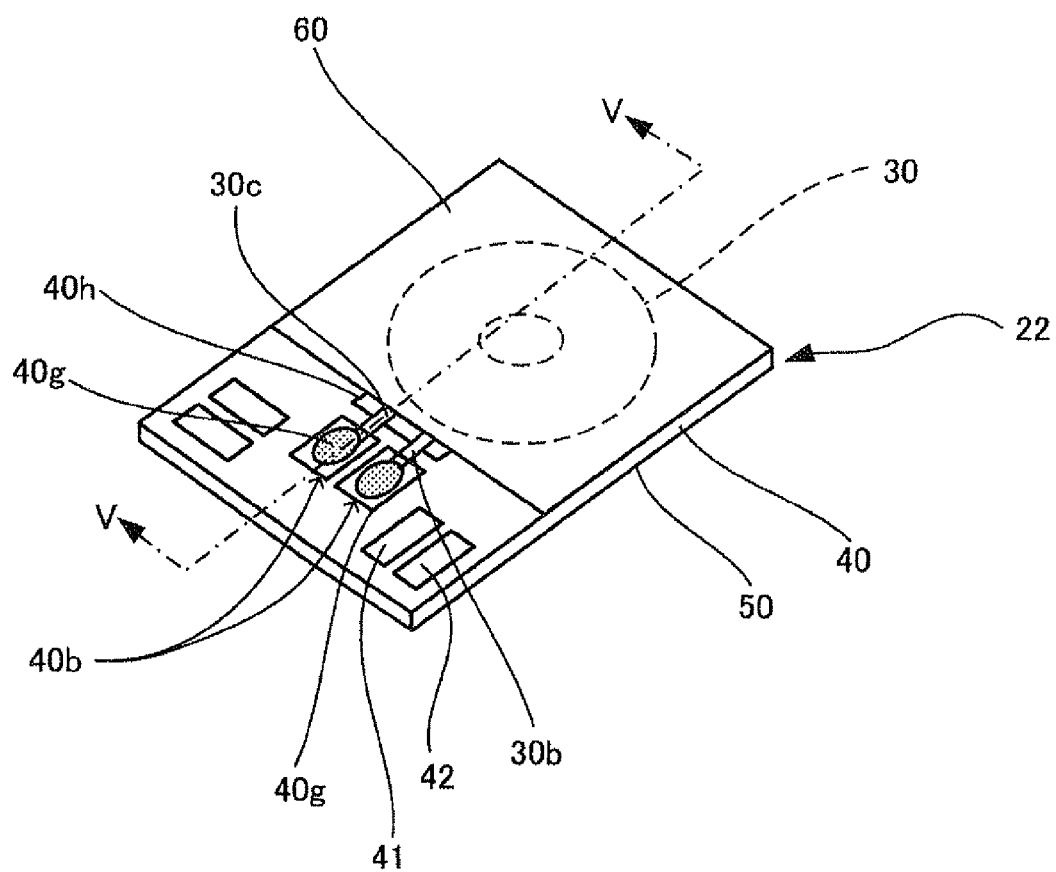
FIG. 3 is a drawing schematically showing a secondary coil unit.
Figure 4:
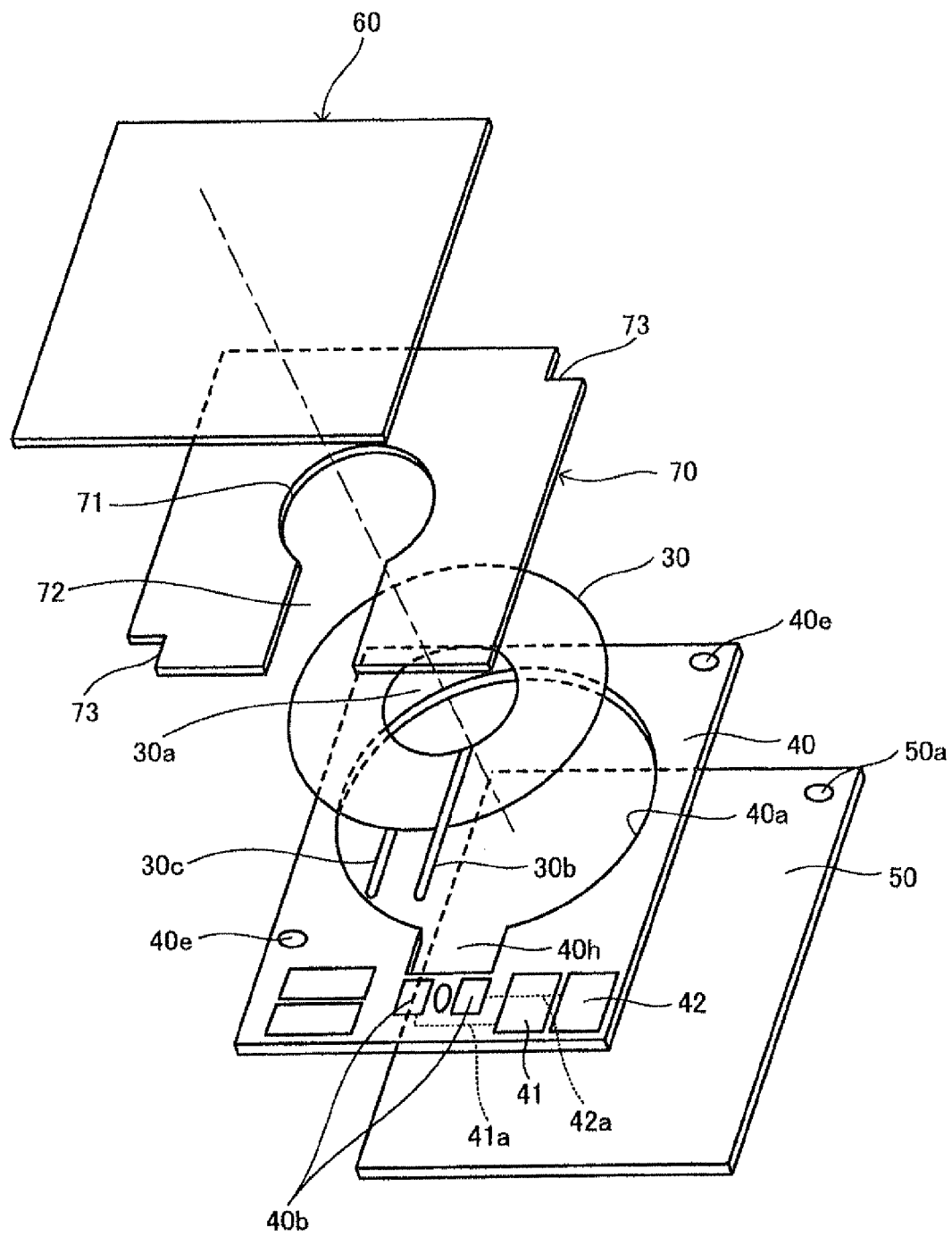
FIG. 4 is an exploded perspective view schematically showing the secondary coil unit.
Figure 5:
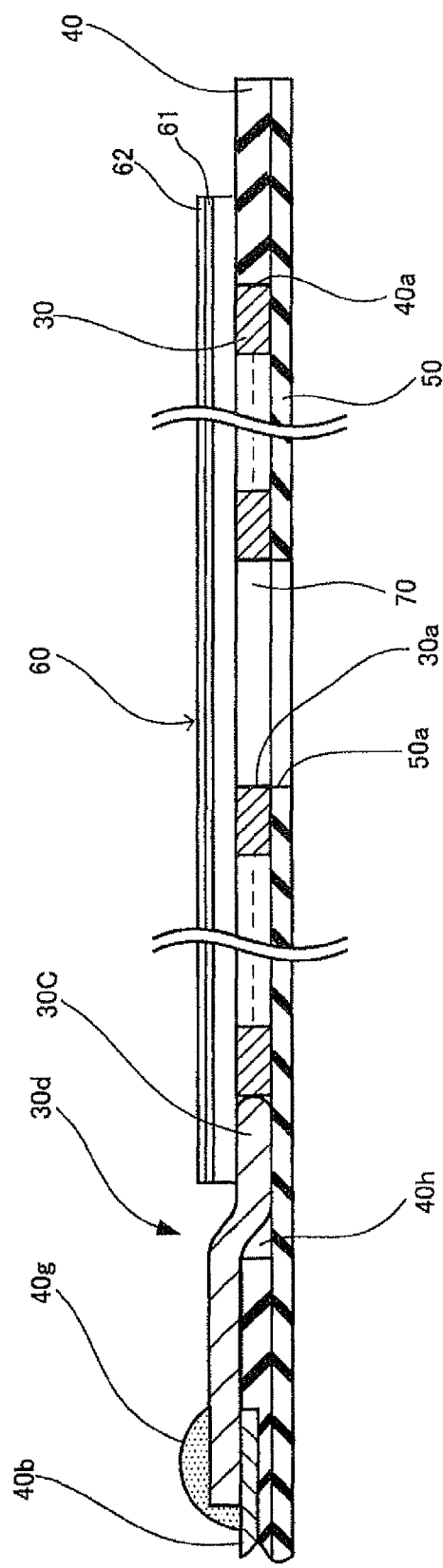
FIG. 5 is a drawing schematically showing a section taken along line V-V of FIG. 3.
Figure 6:
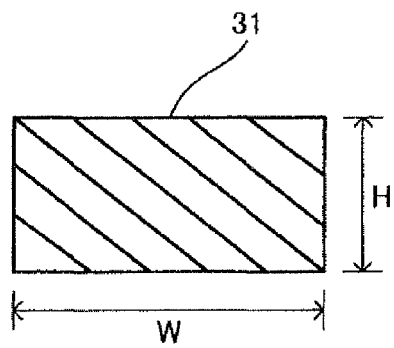
FIG. 6 is a sectional view of a coil wire.
Figure 7:
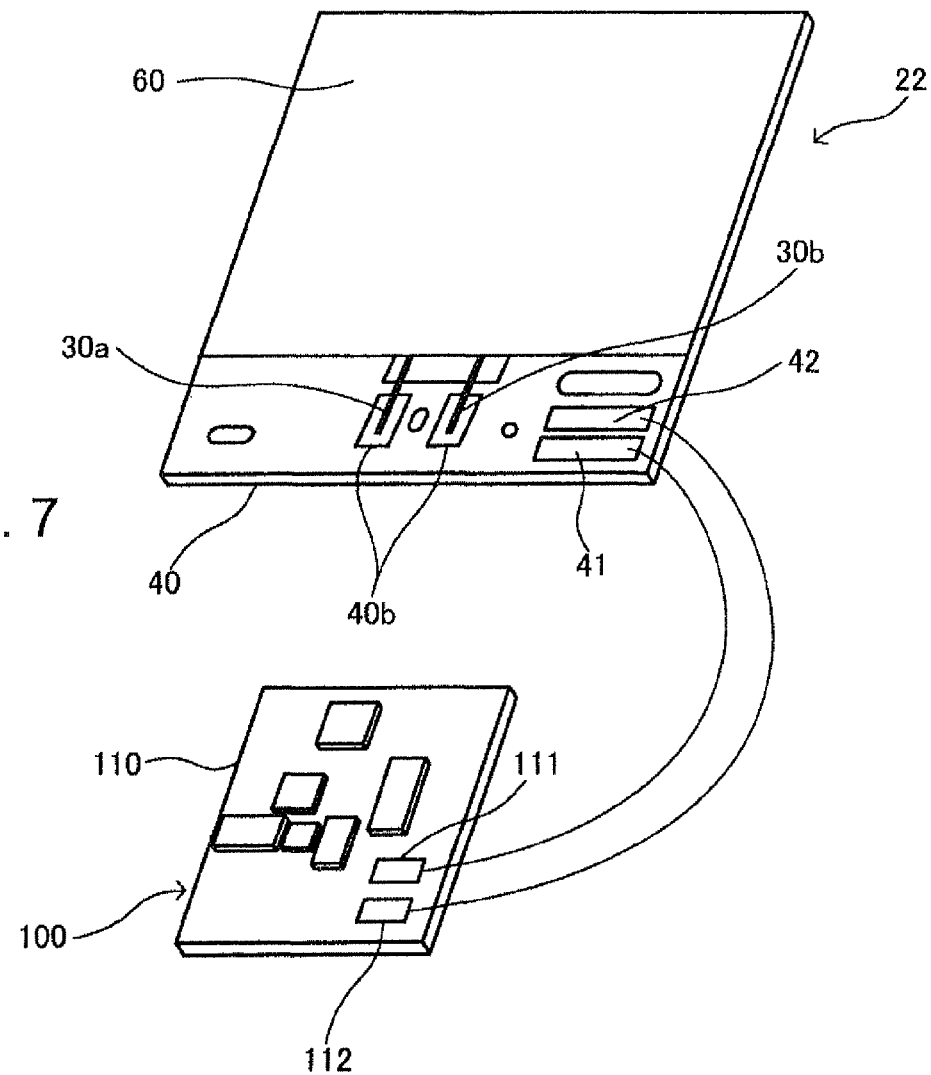
FIG. 7 is a drawing showing a form where a secondary coil unit and a control unit are electrically connected.

FIG. 3 is a drawing schematically showing the coil unit 22 (secondary coil unit) of the cell phone 20. FIG. 4 is an exploded perspective view schematically showing the coil unit 22 of the cell phone 20. In FIGS. 3 and 4, the non-transmission surface of the coil unit 22 opposite to the transmission surface thereof opposed to the coil unit 12 of the charger 10 in FIG. 1 is seen from above. The transmission surfaces refer to the respective surfaces of the coil unit 22 and the coil unit 12 opposed to each other in FIG. 1 and the non-transmission surfaces refer to the respective surfaces opposite to the transmission surfaces of the coil unit 12 and coil unit 22. FIG. 5 is a drawing schematically showing a section taken along line V-V of FIG. 3. FIG. 6 is a sectional view showing an example of a coil wire. FIG. 7 shows a form in which the coil unit 22 and a control unit (coil control unit) 100 are electrically coupled.

The coil unit 22 includes a coil 30, a wiring substrate 40, and a magnetic substance 60 as minimum elements. In this embodiment, a coil housing 40a may be formed on the wiring substrate 40 so that the transmission surface of the coil 30 is positioned on the back surface of the wiring substrate 40. For example, the coil housing 40a is a hole that penetrates the wiring substrate 40 in the thickness direction. Also, in this embodiment, a protection sheet 50 for protecting the transmission surface of the coil 30 may be provided on the back surface of the wiring substrate 40 shown in FIG. 4.

The wiring substrate 40 is provided with connection terminals 40b to which both the ends of the coil 30 are connected, external connection terminals 41 and 42, and wiring patterns 41a and 42a. No circuit element other than the coil 30 is mounted on the wiring substrate 40. The external connection terminals 41 and 42 are terminals used when connecting the coil unit 22 to an external apparatus such as the control unit 100 shown in FIG. 7. The wiring patterns 41a and 42a connect between the connection terminals 40b and external connection terminals 41 and 42. While the wiring patterns 41a and 42a may be formed on the front surface (the surface on which the terminals 40b, 41a, and 42a are formed) of the wiring substrate 40 shown in FIG. 4, these patterns may be provided on the back surface of the wiring substrate 40 and connected to the terminals 40b, 41a, and 42a via through-holes.

In this embodiment, as shown in FIG. 7, the secondary coil unit 22 is separated from the secondary control unit 100. The secondary coil unit 22 is coupled to the secondary control unit 100 via the external connection terminals 41 and 42. Since the minimum elements of the coil unit 22 are the coil 30, wiring substrate 40, and magnetic substance 60, the coil unit 22 is downsized or slimmed down. Thus, the coil unit 22 has greater flexibility in its insertion position in the electronic apparatus 20, insertion space, and insertion method. Depending on the materials of the coil 30 and magnetic sheet 60, the coil unit 22 is difficult to maintain its shape with only the coil 30 and magnetic sheet 60; however, integration with the wiring substrate 40, which is a rigid body, allows the coil unit 22 to maintain its shape.

The control unit 100 shown in FIG. 7 includes a substrate 110 on which various electronic components for drive-controlling the secondary coil 130 are mounted. The substrate 110 is provided with external connection terminals 111 and 112 electrically connected to the external connection terminals 41 and 42 formed on the substrate 40 of the secondary coil unit 22. The control unit 100 will be described later.

The coil 30 is, for example, a flat coil. The magnetic substance 60 takes the shape of a sheet or a plate. Hereafter, a sheet-shaped magnetic substance will be also referred to as a magnetic sheet. The magnetic sheet 60 is provided in such a manner that it is opposed to the non-transmission surface of the flat coil 30. In this embodiment, the magnetic sheet 60 is bonded to the non-transmission surface of the flat coil 30 and the wiring substrate 40 with a spacer 70 (e.g., double-sided tape) therebetween.

The flat coil 30 is not limited to any particular coil if it is a flat coil. For example, an air-core coil formed by winding a single-conductor or multi-conductor, coated coil wire on a plane may be used. In this embodiment, a coil formed by winding a single-conductor coil wire 31, whose section is a rectangle with a width W and a height H, on a plane as shown in FIG. 6 is used; however, the section is not limited thereto. Hereafter, the coil unit 22 according to this embodiment will be described taking the flat coil 30 having an air-core 30a (see FIGS. 4, 5) as an example.

As described above, the flat coil 30 is housed in the coil housing 40a provided on the wiring substrate 40. This allows slimming down the coil unit 22 by a part or all of the thickness H (see FIG. 6) of the flat coil housed in the coil housing 40a. This also makes it easy to make the transmission surface of the flat coil 30 flush with the adjacent surface. Actually, in this embodiment, no recesses or protrusions are formed on the protection sheet 50. Also, the coil housing 40a has a shape corresponding the external shape of the flat coil 30. Thus, if the flat coil 30 is only housed in the coil housing 40a, the flat coil 30 is positioned in the wiring substrate 40. This facilitates positioning. As shown in FIG. 4, the wiring substrate 40 has multiple positioning holes 40e, and the protection sheet 50 has multiple positioning holes 50a (only one is shown in FIG. 4).

The coil unit 22 may be assembled, for example, using fixtures. First, the pins of the fixtures are passed through the positioning holes 50a of the protection sheet 50 and the positioning holes 40e of the wiring substrate 40, and then the protection sheet 50 having a single-sided tape and wiring substrate 40 are laminated. Next, the coil 30 is disposed in the coil housing 40a of the wiring substrate 40 and bonded to the protection sheet 50. Then, the magnetic sheet 60 is bonded to the wiring substrate 40 with the spacer 70 therebetween in such a manner that the spacer 70 covers the coil 30. Finally, both ends of the flat coil 30 are soldered to the connection terminals 40b of the wiring substrate 40. This completes the coil unit 22. While the protection sheet 50 is a sheet for protecting at least the flat coil 30, it covers both the transmission surfaces of the wiring substrate 40 and coil 30 in this embodiment. The protection sheet 50 may have a hole in a position corresponding to the air-core 30a.

The flat coil 30 has a coil inner end drawing line 30b for drawing the inner end of the coil and a coil outer end drawing line 30c for drawing the outer end thereof. As shown in FIG. 4, the coil inner end drawing line 30b is preferably drawn from the non-transmission surface of the flat coil 30. This prevents the coil inner end drawing line 30b from forming protrusions on the transmission surface. This keeps the transmission surface flat, as well as reduces the distance between the respective transmission surfaces of the primary coil L1 and secondary coil L2 shown in FIG. 2. As a result, the transmission efficiency is increased.

The wiring substrate 40 has a drawing line housing 40h connecting with the coil housing 40a (see FIGS. 3 to 5). The drawing line housing 40h is intended to house the coil inner end drawing line 30b of the flat coil 30 and coil outer end drawing line 30c thereof. While only the coil outer end drawing line 30c is shown in FIG. 5, the same goes for the coil inner end drawing line 30b. Since the drawing lines 30b and 30c are housed in the drawing line housing 40h, that area is slimmed down by the thicknesses of the drawing lines 30b and 30c. Also, as shown in FIG. 4, the drawing lines 30b and 30c (only the drawing line 30c is shown in FIG. 5) are bent relatively gently and then go up onto the wiring substrate 40. This reduces wire breaks.

The coil inner end drawing line 30b and coil outer end drawing line 30c are drawn to the contact terminal 40b serving as connection terminals of the coil 30 and then electrically connected to the patterns on the wiring substrate 40 by soldering 40g as shown in FIGS. 3 and 5. The contact terminals 40b are provided on the non-transmission surface (viewer side of FIGS. 3 and 4) of the wiring substrate 40. While the coil inner end drawing line 30b and coil outer end drawing line 30c are housed in the drawing line housing 40h of the wiring substrate 40 as shown in FIG. 5, a bend 30d is made on each of these drawing lines so that these drawing lines go up onto the wiring substrate 40.

Generally, in a power transmission system, a secondary battery is disposed on the non-transmission surface. As for a lithium ion secondary battery or a lithium polymer secondary battery typically used in cell phones and MP3 players in recent years, the temperature thereof during charging is required to be about 45° C. or less due to the physical properties thereof. If the battery is charged at a temperature exceeding the temperature, a gas may occur inside the battery, causing the degradation of the battery and, in the worst case, the explosion thereof. Therefore, it is necessary to reduce the heating of the battery during charging. Use of the protection sheet 50 as a heat dissipation path reduces an increase in the temperature on the non-transmission surface.

Also, since the inner terminal of the flat coil 30 is drawn from the non-transmission surface, the transmission surface is kept flat. This advantageously increases the adhesiveness between the flat coil 30 and protection sheet (heat dissipation sheet) 50 to reduce the thermal contact resistance to facilitate heat dissipation.

In this embodiment, the protection sheet 50 has an external shape conforming to that of the wiring substrate 40, but not limited thereto. The shape (area) of the protection sheet 50 may be formed so that the area of the transmission surface of the coil unit in contact with the internal shape (area) of an external case is maximized. This further enhances the heat dissipation effect.

The spacer 70 has a hole 71 corresponding to the air-core 30a of the flat coil 30, a notch 72 that connects with the hole 71 and corresponds to the drawing line housing 40h of the wiring substrate 40, and notches 73 corresponding to the positioning holes 40e of the wiring substrate 40. The disposition of the notch 72 prevents (at least reduces) recesses and protrusions formed by the thicknesses of the drawing lines 30b and 30c of the flat coil 30 from affecting the magnetic sheet 60. Also, the disposition of the notches 73 makes it easy to perform positioning between the wiring substrate 40 and protection sheet 50 using the above-mentioned positioning holes 40e and 50a.

The magnetic sheet 60 has functions of receiving magnetic flux from the flat coil 30 and increasing the inductance of the flat coil 30. The material of the magnetic sheet may be various magnetic materials such as a soft magnetic material, a ferrite soft magnetic material, and a metal soft magnetic material. However, if only one magnetic sheet (magnetic substance) is provided for the coil 30, the coil characteristics with respect to this contactless power transmission largely depend on the characteristics of the one magnetic sheet.

In this embodiment, in order to increase the freedom degree of choosing from the coil characteristics that cannot be chosen with one magnetic sheet, multiple magnetic sheets are used. Specifically, in this embodiment, laminated magnetic sheets 61 and 62 having different characteristics, particularly, different magnetic permeabilities (magnetic sheets 61 and 62 constitute the magnetic sheet 60 as a multilayer body) are provided for the coil 30. By doing so, the coil unit 22 can obtain different characteristics unlike a case where one magnetic sheet is used alone or a case where two magnetic sheets having identical characteristics are used. The first magnetic sheet 61 and second magnetic sheet 62 are laminated by bonding them together, for example, using a double-sided tape.

3. Example Experiment with Respect to Secondary Coil Unit

The coil 30 used in an experiment was formed by winding the coil wire 31 having a section as shown in FIG. 6. When an alternating current of 1 mA with a frequency of 100 kHz was passed through the coil 30, the coil 30 alone showed an inductance of 6.366 μH and a resistance of 0.234Ω. By bonding at least one of the magnetic sheets 61 and 62 having different characteristics to the flat coil 30 in combination to be described later, six types of coil units (1) to (6) were obtained.

A sheet A and a sheet B were used as magnetic sheets having different characteristics, particularly, different magnetic permeabilities. The relative magnetic permeability of the sheet A at an alternating-current frequency of 100 KHz is smaller than that of the sheet B.

The coil units (1) to (6) used in the experiment are as follows.

(1) A coil unit where a single sheet A is bonded to the non-transmission surface of the coil 30

(2) A coil unit where two laminated sheets A are bonded to the non-transmission surface of the coil 30, that is, a coil unit where both magnetic sheets 61 and 62 are used as sheets A (3) A coil unit where a single sheet B is bonded to the non-transmission surface of the coil 30

(4) A coil unit where two laminated sheets B are bonded to the non-transmission surface of the coil 30, that is, a coil unit where both magnetic sheets 61 and 62 are used as sheets B (5) A coil unit where a sheet A and a sheet B are sequentially bonded to the non-transmission surface of the coil 30, that is, a coil unit where a sheet A is used as a sheet 61 and a sheet B is used as a sheet 62

(6) A coil unit where a sheet B and a sheet A are sequentially bonded to the non-transmission surface of the coil 30, that is, a coil unit where a sheet B is used as a sheet 61 and a sheet A is used as a sheet 62

The coil units (5) and (6) are units corresponding to this embodiment. In particular, the coil unit (5) is a coil unit used as the coil unit 22 according to this embodiment. As comparative examples, the coil unit (1) is a first use condition, the coil unit (3) is a second use condition, the coil unit (2) is a third use condition, and the coil unit (4) is a fourth use condition.

However, if the coil unit (1) where a single sheet A is used as a magnetic substance and the coil unit (3) where a single sheet B is used as a magnetic substance are regarded as related-art examples, it is understood that the coil units (2) and (4) where multiple (e.g., two) sheets A or sheets B alone are laminated, as well as the coil unit (5) and (6) where a sheet A and a sheet B, which are of different types, are laminated by multiple (e.g., two) units, increase the freedom degree of choosing from the coil characteristics (inductance, resistance, Q value, and the like) compared with the coil units (1) and (3).

In the experiment, an alternating current of 1 mA was passed through each of the above-mentioned coil units (1) to (6) while changing the frequency, and then the equivalent electric resistance (Ω) and self-inductance (μH) at different frequencies were measured. The frequency was changed from 50 kHz to 150 kHz at intervals of 10 kHz.

Figure 8:
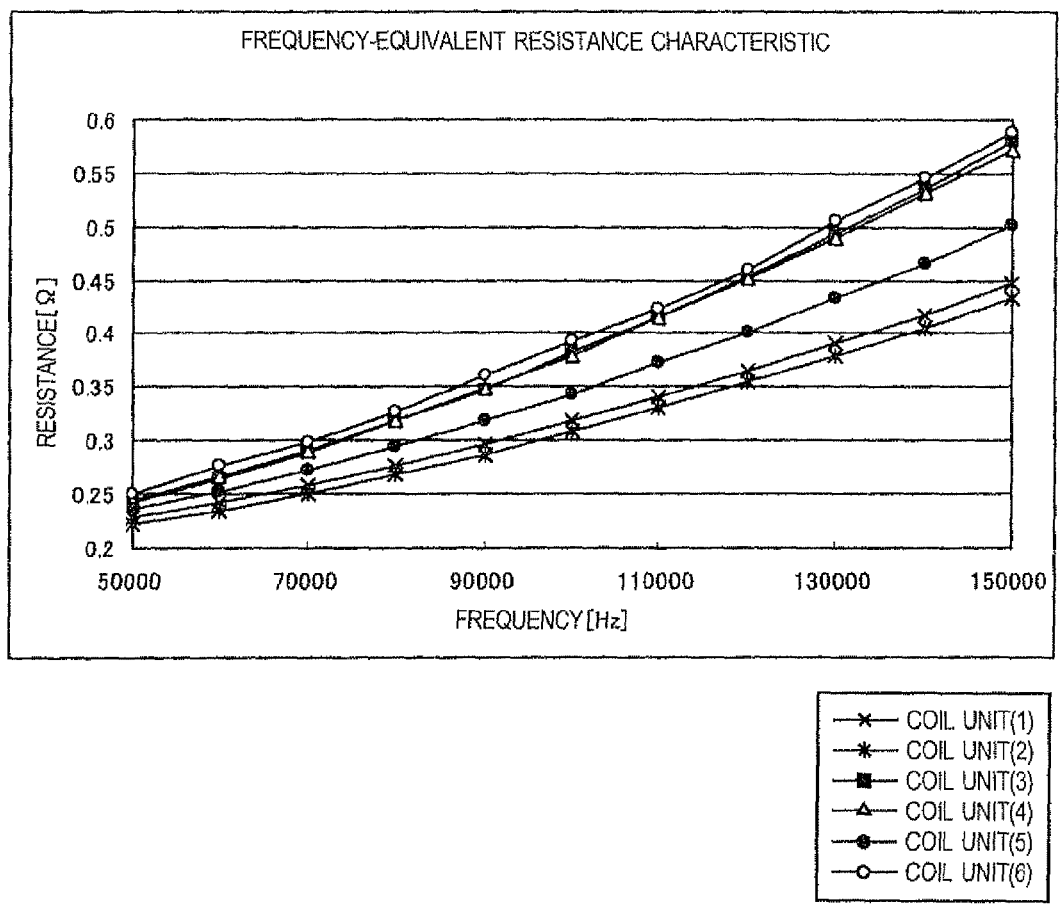
FIG. 8 is a graph showing frequency-equivalent resistance characteristics obtained from an experiment.
Figure 9:
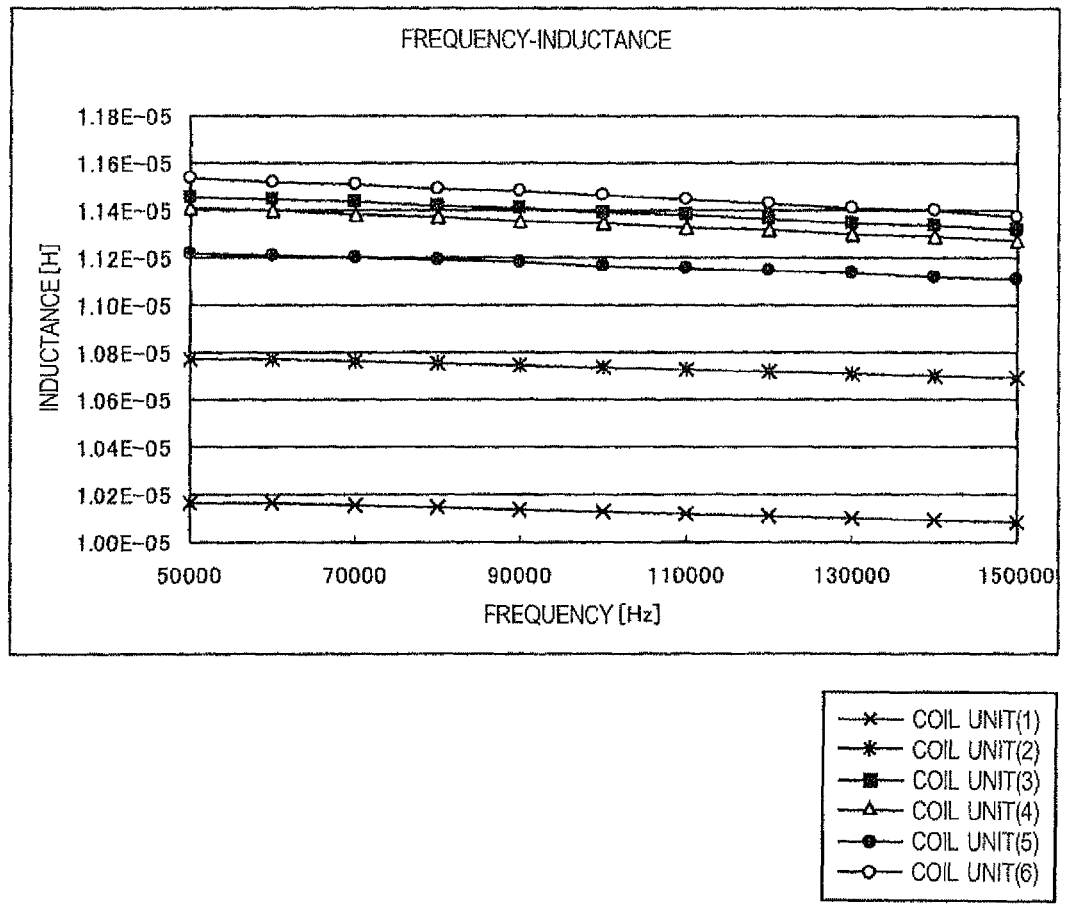
FIG. 9 is a graph showing frequency-inductance characteristics obtained from the experiment.

FIG. 8 is a graph showing frequency-equivalent resistance characteristics obtained from the above-mentioned experiment. FIG. 9 is a graph showing frequency-inductance characteristics. FIG. 10 is a table where the values at a frequency of 1.00 kHz extracted from these graphs are organized. In FIGS. 8 and 9, "x" indicates a measurement result of the coil unit (1), "*" indicates that of the coil unit (2), "■" indicates that of the coil unit (3), "triangle" indicates that of the coil unit (4), "●" indicates that of the coil unit (5), and "○" indicates that of the coil unit (6).

From the experiment, the following turned out:

(a) If a single sheet A and a single sheet B are compared, the equivalent resistance (0.318Ω) of the coil of the coil unit (1) in the first use condition where a single sheet A is used as a magnetic path for the coil is smaller than the equivalent resistance (0.382Ω) of the coil of the coil unit (3) in the second use condition where a single sheet B is used as a magnetic path therefor. Also, the inductance (10.13 μH) of the coil of the coil unit (1) is smaller than the inductance (11.392 μH) of the coil of the coil unit (3).

(b) As for the coil unit (5) according to this embodiment, the Q value (20.4579) of the coil is larger than the Q value (20.01728) of the coil of the coil unit (1) in the first use condition and the Q value (18.73771) of the coil of the coil unit (3) in the second use condition. This is an advantage obtained by combining the sheet A and sheet B. From the fact that the Q value of the coil, which is proportionate to the ratio (L/R) of the inductance L to equivalent resistance R, is larger, it is understood that a larger inductance is secured and the equivalent resistance R is reduced and thus the characteristics of the coil are improved.

(c) The above-mentioned advantage of (b) depends on the order of the lamination of the sheets A and B with respect to the coil and is an advantage specific to the coil unit (5) where the sheet A is positioned between the coil and sheet B. Unlike the coil unit (5), the Q value (18.3703) of the coil of the coil unit (6) where the sheet B is disposed between the coil and sheet A is smaller than the Q value (20.01728) of the coil unit (1) in the first use condition and the Q value (18.73771) of the coil of the coil unit (3) in the second use condition. Nonetheless, the coil unit (6) indicates the largest inductance (11.461 μH). Therefore, the coil unit (6) can be used if greater importance is placed on the inductance. The coil unit (6) also indicates the largest equivalent resistance (0.392Ω).

(d) The inductance (11.168 μH) of the coil of the coil unit (5) is larger than the inductance (10.131 μH) of the coil unit (1) in the first use condition and is smaller than the inductance (11.392 μH) of the coil unit (3) in the second use condition.

(e) The equivalent resistance (0.343Ω) of the coil of the coil unit (5) is larger than the equivalent resistance (0.318Ω) of the coil unit (1) in the first use condition and is smaller than the equivalent resistance (0.382Ω) of the coil unit (3) in the second use condition. From the above-mentioned (d) and (e), it is understood that the inductance and equivalent resistance of the coil unit (5) according to this embodiment are both an intermediate value between those of the coil units (1) and (3) where the sheet A or sheet B is used alone and thus an increase in equivalent resistance is reduced while a relatively high inductance is secured.

(f) Next, the coil unit (5) according to this embodiment is compared with the coil unit (2) where two sheets A are laminated and the coil unit (4) where two sheets B are laminated. The Q value (20.4579) of the coil of the coil unit (5) is smaller than the Q value (21.83864) of the coil unit (2) in the third use condition where two sheets A are laminated and is larger than the Q value (18.80811) of the coil of the coil unit (4) in the fourth use condition where two sheets B are laminated. However, it is understood that the Q value of the coil of the coil unit (5) is closer to the Q value of the coil of the coil unit (2) indicating the largest value. Since the Q value of the coil is proportionate to the ratio (L/R) of the inductance L to equivalent resistance R, the above-mentioned points are supported by findings (g) and (h) below obtained from comparisons made with respect to the inductance and equivalent resistance.

(g) The inductance (11.168 μH) of the coil of the coil unit (5) is larger than the inductance (10.740 μH) of the coil unit (2) in the third use condition and is smaller than the inductance (11.345 μh) of the coil unit (4) in the fourth use condition. However, it is understood that the inductance of the coil of the coil unit (5) is closer to the large inductance of the coil unit (4).

(h) The equivalent resistance (0.343Ω) of the coil of the coil unit (5) is larger than the equivalent resistance (0.309Ω) of the coil unit (2) in the third use condition and is smaller than the equivalent resistance (0.379Ω) of the coil of the coil unit (4) in the fourth use condition. The equivalent resistance of the coil of the coil unit (5) is approximately an intermediate value between those of the coil unit (2) and (4)

(i) In conclusion, it is understood that the coil units (5) and (6) including the two magnetic sheets, magnetic sheets 61 and 62, having different characteristics, particularly, different magnetic permeabilities obtain characteristics different from those of the coil units (1) and (3) including a single magnetic substance and those of the coil units (2) and (4) including laminated magnetic substances of same type and thus increase the freedom degree of choosing from the characteristics. This allows bringing the equivalent resistance or inductance close to a designed value without having to change the number of turns of the coil or the wire diameter thereof. In particular, as for the coil unit (5), the Q value of the coil is relatively high; therefore, the transmission efficiency is improved by reducing the equivalent resistance and preventing a reduction in inductance. The above-mentioned tendency is not a tendency only at a frequency of 100 kHz; from FIGS. 9 and 10, it is understood that a similar tendency exists in almost the whole measurement frequency range.

As another advantage, the sheet B also has a high magnetic shield property, since it has a high magnetic permeability. Therefore, in the coil unit (5), magnetic flux leaking from the first magnetic substance (sheet A) closer to the coil 30 is received by the second magnetic substance 62 (sheet B) so that the magnetic flux is prevented from leaking out toward the non-transmission surface of the second magnetic substance 62. Therefore, a magnetic shield plate does not always need to be disposed on the magnetic substance 62 in an overlapped manner.

4. Coil Unit of Charger (Primary Coil Unit)

Figure 11:
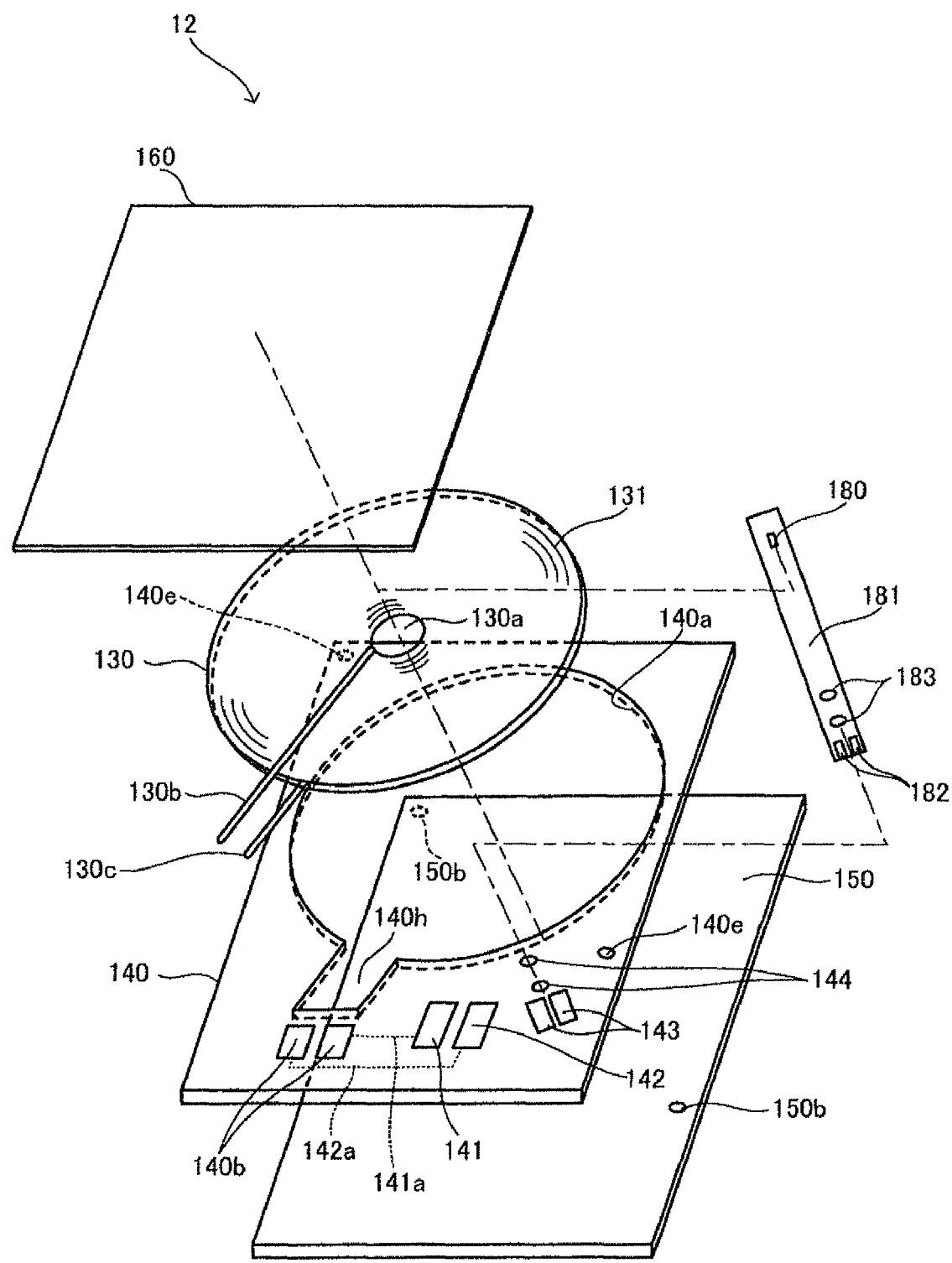
FIG. 11 is an exploded perspective view schematically showing the primary coil unit.
Figure 12:
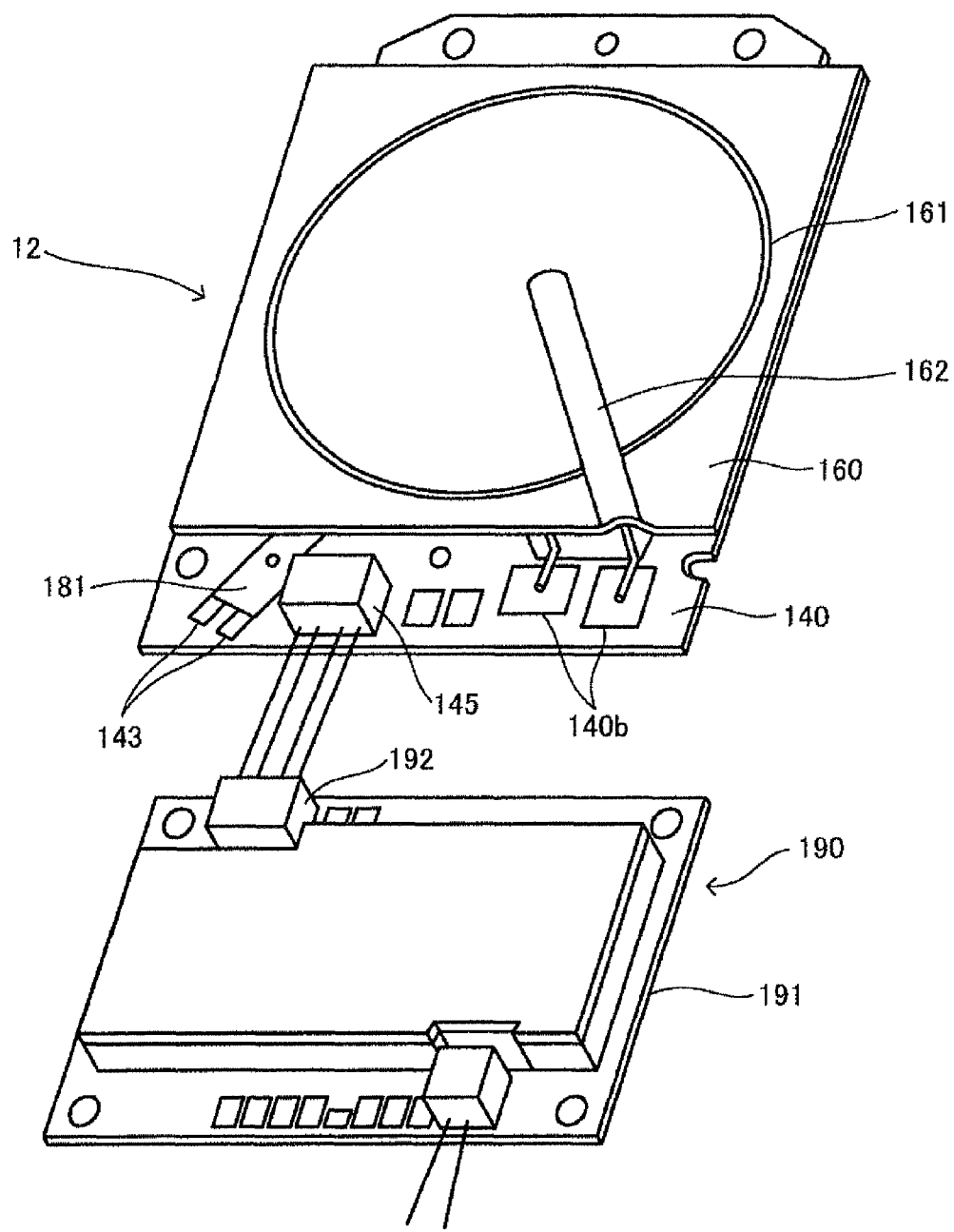
FIG. 12 is a schematic perspective view of a power transmission apparatus where the primary coil unit and a control unit are electrically connected.

FIG. 11 is an exploded perspective view schematically showing the coil unit 12 of the charger 10. In FIG. 11, the non-transmission surface of the coil unit 12 opposite to the transmission surface thereof opposed to the coil unit 22 of the cell phone 20 in FIG. 1 is seen from above. FIG. 12 is a schematic perspective view of a power transmission apparatus including the primary coil unit 12 and a primary control unit 190 coupled thereto. In FIG. 12, a pattern on a substrate 140 of the primary coil unit 12 is partially different from that shown in FIG. 11; however, both the substrates 140 have an identical basic structure.

The primary coil unit 12 shown in FIG. 11 includes a coil 130, a wiring substrate 140, and a magnetic substance 160 as minimum elements. For example, the coil 130 is a flat coil formed by winding a coil wire 131. The magnetic substance (also referred to as "magnetic sheet") 160 forms a magnetic path for the coil 130. The wiring substrate 140 is preferable in maintaining the shape of the coil unit 12 and in electrically relay-connecting the flat coil 130 and a flexible substrate 181 to be described later.

In this embodiment, as shown in FIG. 12, the primary coil unit 12 is separated from the primary control unit 190. Since the minimum elements of the coil unit 12 are the coil 30, wiring substrate 140, and magnetic substance 160, the coil unit 22 is downsized or slimmed down. Thus, the primary coil unit 12 has greater flexibility in its insertion position in the electronic apparatus (charger) 10, insertion space, and insertion method. Depending on the materials of the coil 130 and magnetic sheet 160, the coil unit 12 is difficult to maintain its shape with only the coil 130 and magnetic sheet 160; however, integration with the wiring substrate 140, which is a rigid body, allows the coil unit 12 to maintain its shape.

The coil unit 12 may include the flexible substrate 181 disposed in parallel with the flat coil 130 in a plane in which the flat coil 130 is disposed, and a temperature detection element mounted on the flexible substrate 181, such as a thermistor 180.

In the coil unit 12 according to this embodiment, the thin elements, that is, the flat coil 130, wiring substrate 140, magnetic substance 160, and flexible substrate 181, are laminated. Therefore, the coil unit 12 is slimmed down. Also, the temperature detection element such as the thermistor 180 is disposed in a plane in which the flat coil 130 is disposed; therefore, when a foreign object intrudes into the gap between the primary coil L1 (130) and secondary coil L2 shown in FIG. 2, the thermistor 180 detects an increase in temperature caused by the intrusion.

The flat coil 130 according to this embodiment has an air-core 130a in its center. The flat coil 130 is an air-core coil formed by winding the coil wire 131 on a plane in a spiral fashion. In this case, the flexible substrate 181 is disposed in such a manner that the thermistor 180 mounted thereon is positioned in the air-core 130a of the flat coil 130. The thermistor 180 and flexible substrate 181 will be described in detail.

If one surface of the flat coil 130 is referred to as the transmission surface and other surface thereof is referred to as the non-transmission surface, the magnetic substance 160 according to this embodiment is disposed in such a manner that it is opposed to the non-transmission surface of the flat coil 130. In this case, the flexible substrate 181 is disposed between the coil wire 131 and magnetic substance 160, that is, between the non-transmission surface of the flat coil 130 and the magnetic substance 160. That is, the flexible substrate 181 does not exist on the transmission surface of the flat coil 130; therefore, the distance between the transmission surface of the primary coil L1 (130) and that of the secondary coil L2 shown in FIG. 2 is reduced. As a result, the transmission efficiency is improved.

The wiring substrate 140 according to this embodiment has a coil housing 140a. For example, the coil housing 140a is a coil housing hole penetrating the wiring substrate 140 between the front and back surfaces thereof. The flat coil 130 is housed in the coil housing hole 140a. Thus, a part or all of the thickness of the spirally-wound, flat coil 130 is absorbed by the coil housing hole 140a of the wiring substrate 140 so that the total thickness of the coil unit 12 is reduced. Also, since the transmission surface of the flat coil 130 is exposed via the coil housing hole 140a of the wiring substrate 140, the distance between the transmission surface of the primary coil L1 (130) and that of the secondary coil L2 shown in FIG. 2 is reduced. As a result, the transmission efficiency is improved.

A protection sheet 150 for protecting the flat coil 130 and wiring substrate 140 may be provided on the transmission surface of the wiring substrate 140.

Hereafter, the elements will be described more specifically.

The flat coil 130 is not limited to any particular coil if it is a flat coil. For example, the flat coil 130 may be an air-core coil formed by winding a single-conductor or multi-conductor coated coil wire on a plane. In this embodiment, a multi-conductor coil wire including dozen or so conductors is used.

As described above, the flat coil 130 is housed in the coil housing 140a provided on the wiring substrate 140. This slims down the primary coil unit 12, as well as makes it easy to make the flat coil 130 flush with the adjacent surface. Actually, in this embodiment, no recesses or protrusions are formed on the protection sheet 150. Also, the coil housing 140a has a shape corresponding to the external shape of the flat coil 130; therefore, if the flat coil 130 is only housed in the coil housing 140a, the flat coil 130 is positioned in the wiring substrate 140. This facilitates positioning.

The flat coil 130 has a coil inner end drawing line 130b for drawing the inner end of the coil and a coil outer end drawing line 130c for drawing the outer end thereof. As shown in FIG. 11, the coil inner end drawing line 130b is preferably drawn from the non-transmission surface of the flat coil 130. This prevents the coil inner end drawing line 130b from forming protrusions on the transmission surface. This makes the transmission surface flat, as well as improves the transmission efficiency.

The wiring substrate 140 has a drawing line housing hole 140h connecting with the coil housing hole 140a. The drawing line housing hole 140h is intended to house the coil inner end drawing line 130b of the flat coil 130 and coil outer end drawing line 130c thereof. By housing the drawing lines 130b and 130c in the drawing line housing hole 140h, that area is slimmed down by the thicknesses of the drawing lines 130b and 130c. Also, the drawing lines 130b and 130c are bent relatively gently by the drawing line housing hole 140h and then go up onto the wiring substrate 140. This reduces wire breaks.

The coil inner end drawing line 130b and coil outer end drawing line 130c are drawn to contact electrodes (coil connection terminals) 140b and electrically connected to the contact electrodes 140b by soldering. The contact electrodes 140b are provided on the non-transmission surface (viewer side of FIG. 11) of the wiring substrate 140.

As shown in FIG. 11, the wiring substrate 140 is provided with external connection terminals 141 and 142. The external connection terminal 141 is coupled to one of the contact electrodes 140b, for example, via a wiring line 141a provided on the back surface (transmission surface) of the wiring substrate 140. The external connection terminal 142 is coupled to the other contact electrode 140b, for example, via a wiring line 142a provided on the back surface (transmission surface) of the wiring substrate 140. The wiring patterns 141a and 142a may be provided on the front surface of the wiring substrate 40. The wiring substrate 140 has multiple (e.g., two) positioning holes 140e for positioning the protection sheet 150.

While the protection sheet 150 is a sheet for protecting at least the flat coil 130, it covers both the transmission surface of the wiring substrate 140 and that of the flat coil 130 in this embodiment. The protection sheet 150 is not limited to any particular sheet if it is insulative. As shown in FIG. 11, the protection sheet 150 has positioning holes 150b in positions corresponding to the positioning holes 140e of the wiring substrate 140. The positioning holes 140e and positioning holes 150b facilitate positioning between the wiring substrate 140 and protection sheet 150. Also, in this embodiment, the protection sheet 150 has an external shape conforming to that of the wiring substrate 140, but not limited thereto. The shape (area) of the protection sheet 150 may be formed so that the area of the transmission surface of the coil unit in contact with the internal shape (area) of an external case is maximized. This further enhances a heat dissipation effect caused when the protection sheet 150 is used as a heat dissipation sheet.

Also, since the inner terminal of the flat coil 130 is drawn from the non-transmission surface, the transmission surface is kept flat. This advantageously increases the adhesiveness between the flat coil 130 and protection sheet (heat dissipation sheet) 150 to reduce the thermal contact resistance to facilitate heat dissipation.

The magnetic sheet 160 is bonded to the non-transmission surface of the flat coil 130. The magnetic substance 160 has basic functions of receiving magnetic flux from the flat coil 130 and increasing the inductance of the flat coil 130. The material of the magnetic sheet may be various magnetic materials such as a soft magnetic material, a ferrite soft magnetic material, and a metal soft magnetic material.

The magnetic substance 160 of the charger 10 is made of a material having relatively high flexibility. Thus, even if the coil inner terminal drawing line 130b of the primary coil 130 or the flexible substrate 181 protrude from the non-transmission surface of the primary coil 130, the magnetic substance 160 deforms itself in accordance with such protrusions. For this reason, there is no need to dispose a spacer for absorbing the thickness of the coil inner terminal drawing line 130b or flexible substrate 181 between the primary coil 130 and magnetic substance 160. Note that since the flexible substrate 181 is extremely thin, the magnetic substance 160 hardly deforms itself.

5. Temperature Detection Element of Primary Coil

If there is a metal foreign object between the primary coil unit 12 and coil unit 22 in a contactless power transmission system using an electromagnetic induction action as shown in FIG. 1 during power transmission, that foreign object may generate an eddy current to cause heating so that the foreign object and flat coil 130 are overheated. Also, even if there is no such foreign object, the flat coil 130 may overheat for some reason.

For this reason, in this embodiment, the thermistor 180, which is an example of a temperature detection element (temperature detection sensor), is disposed in an area (magnetic force line generation area) where magnetic lines of force are generated by the flat coil 130. Particularly, in this embodiment, the thermistor 180 is disposed in the air-core 130a of the flat coil 130 so that the temperature of the flat coil 130 and its periphery is monitored. This is because, in this embodiment, the air-core 130a has a particularly high magnetic flux density and when a foreign object intrudes into the air-core 130a, the temperature is increased most abruptly due to an eddy current generated by the foreign object and a large amount of heat is generated. The thermistor 180 disposed in the air-core 130a reliably detects that the foreign object has intruded into the air-core 130a.

When the temperature detected by the thermistor 180 becomes a given temperature or higher, when the ambient temperature and the temperature detected by the thermistor 180 both become a given temperature or higher, or when the speed at which the temperature increases becomes a given value or higher, the driving of the flat coil 130 of the charger 10 may be stopped.

The thermistor 180 is disposed in the air-core 130a of the flat coil 130 using the flexible substrate 181. The flexible substrate 181 is provided with the thermistor 180 at one end thereof and an electrode 182 at the other end thereof. The flexible substrate 181 is disposed along a radiation direction (radius direction) from the air-core 130a of the flat coil 130 on the non-transmission surface of the flat coil 130 between the flat coil 130 and the magnetic substance 160. Thus, the thermistor 180 mounted at one edge of the flexible substrate 181 is disposed in the air-core 130a of the flat coil 130. The electrode 182 of the flexible substrate 181 is connected to an electrode 143 of the wiring substrate 140.

6. Primary Coil Unit and Control Unit

FIG. 12 shows a form in which the primary coil unit 12 and a control unit 190 are electrically coupled. The primary coil unit 12 and control unit 190 constitute a power transmission apparatus. The disposition of the coil inner terminal drawing line 130b, coil outer terminal drawing line 130c, flexible substrate 181, and the like of the coil unit 12 shown in FIG. 12 is different from the disposition of those of the coil unit 12 shown in FIG. 11. However, both the coil units 12 have an identical basic structure.

In the coil unit 12 shown in FIG. 12, the magnetic substance 160 disposed on the non-transmission surface of the flat coil 130 housed in the substrate 140 includes a first deformation part 161 deformed along the flat coil 130 protruding from the surface of the substrate 140 and a second deformation part 162 deformed along the coil inner terminal drawing line 130b. Since the flexible substrate 181 is extremely thin, the magnetic substance 160 absorbs the thickness of the flexible substrate 181 almost without deforming itself.

The control unit 190 shown in FIG. 12 is formed independently of the coil unit 12. The wiring substrate 140 of the coil unit 12 is provided with a first connector 145 connected to the external connection terminal 141 and 142 (FIG. 11). A substrate 191 of the control unit 190 is provided with a second connector 192. By electrically coupling the first connector 145 and second connector 192, the coil unit 12 and control unit 190 are electrically coupled.

The control unit 190 includes various circuits for driving the coil unit 12. For example, the control unit 190 includes a power transmission circuit for energizing the primary coil 130 to perform contactless power transmission. Such a power transmission circuit includes a power transmission control unit. The power transmission control unit receives a signal from the thermistor 180 of the coil unit 12 and, upon detection of an abnormal temperature, shuts down the primary coil 130.

7. Power Transmission Apparatus and Power Reception Apparatus

Figure 13:
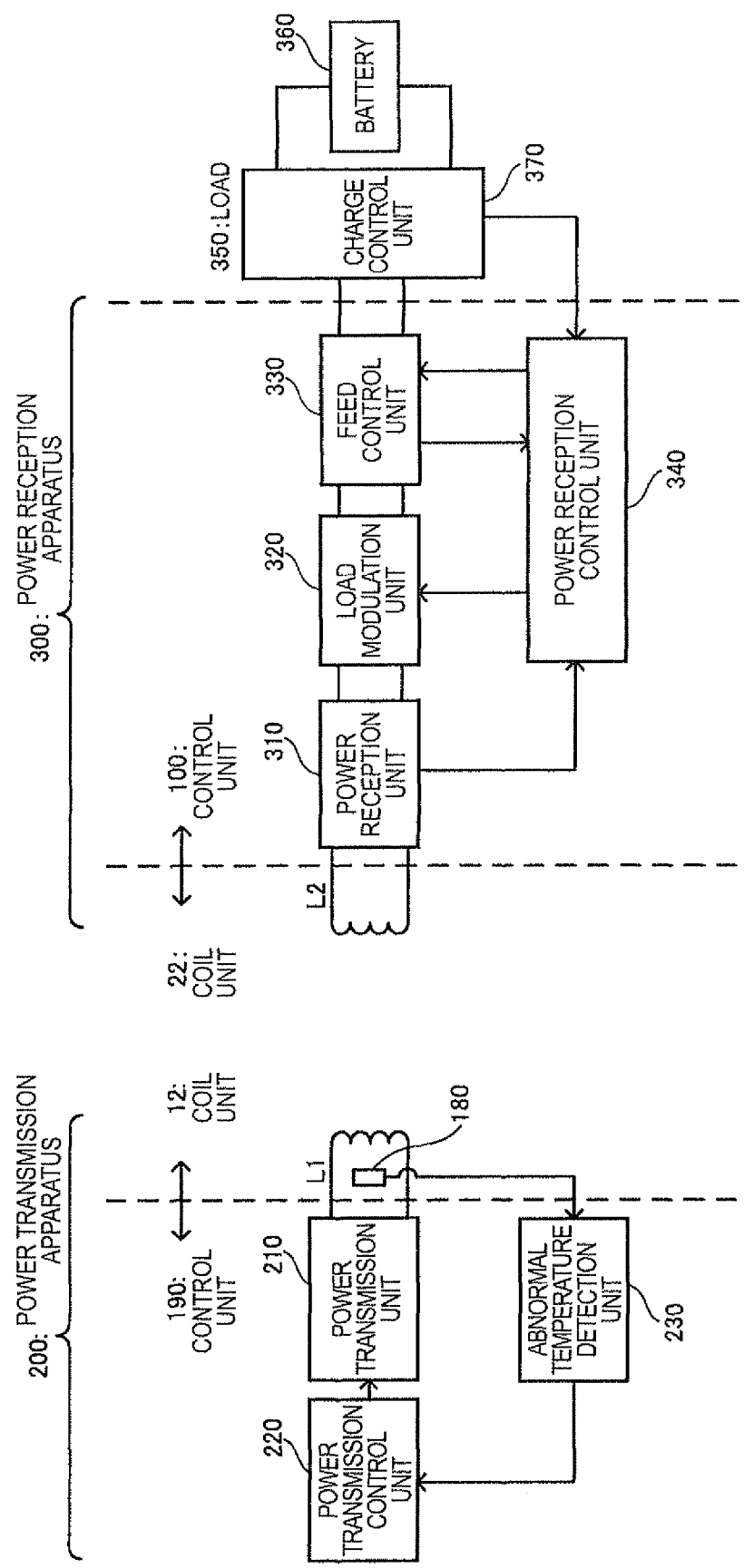
FIG. 13 is a schematic block diagram of the primary and secondary coil units shown in FIG. 12 and control units connected thereto.

FIG. 13 is a schematic block diagram showing an example of a transmission apparatus including the secondary coil unit 22 shown in FIG. 7 and the secondary control unit 100 coupled thereto (power reception apparatus 300) and the primary coil unit 12 shown in FIG. 12 and the primary control unit 190 connected thereto (power transmission apparatus 200).

As shown in FIG. 13, in the power transmission apparatus 200, the control unit 190 may include a power transmission unit 210, a power transmission control unit 220, and an abnormal temperature detection unit 230.

When power is transmitted, the power transmission unit 210 generates an alternating-current voltage with a predetermined frequency and provides the alternating current voltage to the primary coil L1 (130). When data is transmitted, the power transmission unit 210 generates an alternating-current voltage with a different frequency in accordance with the data and provides the alternating-current voltage to the primary coil L1 (130). The power transmission unit 210 may include a first power transmission driver for driving one end of the primary coil L1, a second power transmission driver for driving the other end of the primary coil L1, and at least one capacitor constituting a resonant circuit together with the primary coil L1. For example, the first and second power transmission drivers included in the power transmission unit 210 are each an inverter circuit (buffer circuit) including a power MOS transistor and are controlled by the power transmission control unit 220. Control performed by the power transmission control unit 220 includes control for shutting down the primary coil L1 on the basis of a signal from the abnormal temperature detection unit 230 so as to stop power transmission.

The abnormal temperature detection unit 230 may detect an abnormal temperature itself at the time of intrusion of a foreign object on the basis of a signal from the thermistor 180 or may detect an abnormal temperature from a difference between a temperature detected by the thermistor and the ambient temperature. Also, the abnormal temperature detection unit 230 may detect an abnormality by detecting, from the thermistor temperature, the increase rate of a temperature increased rapidly at the time of intrusion of a foreign object.

In the power reception apparatus 300, the control unit 100 includes a power reception unit 310, a load modulation unit 320, a feed control unit 330, and a power reception control unit 340. The power reception unit 310 converts an alternating-current induced voltage of the secondary coil L2 into a direct-current voltage. This conversion is performed by a rectifier circuit provided in the power reception unit 310.

The load modulation unit 320 performs a load modulation process. Specifically, when the power reception apparatus 300 transmits desired data to the power transmission apparatus 200, the load modulation unit 320 (secondary) variably changes a load in accordance with the transmission data so as to change a signal waveform of an induced voltage of the primary coil L1. When load modulation is performed, a transistor located midway through a feed path in the feed control unit 330 is turned off and a load 350 is placed in a state in which the load 350 is not electrically coupled to the power reception apparatus 300.

The feed control unit 330 controls feed to the load 350. A regulator provided in the feed control unit 330 regulates the voltage level of a direct-current voltage obtained using the rectifier circuit of the power reception unit 310 so as to generate a power supply voltage and provides the power supply voltage to the power reception control unit 340.

The power reception control unit 340 is a unit for performing various types of control on the power reception apparatus 300 and is realized by an integrated circuit apparatus (IC) or the like. The power reception control unit 340 performs various types of sequence control or a determination process necessary for the ID authentication of the power transmission apparatus 200, the position detection of the primary coil L1 and secondary coil L2, frequency detection, load modulation, full charge detection, and the like.

The load 350 includes a charge control unit 370 for performing charge control or the like on a battery 360. The charge control unit 370 (charge control IC) is realized by an integrated circuit apparatus or the like. Like a smart battery, the battery 360 itself may be provided with the function of the charge control unit 370.

8. Modifications

While this embodiment has been described in detail, it will be understood by those skilled in the art that various modifications can be made thereto without substantively departing from the novel features and advantages of the invention. Therefore, such modifications fall within the scope of the invention. For example, terms described at least once in conjunction with broader or synonymous different terms in this specification or appended drawings can be replaced with the different terms in any part of the specification or drawings.

The above-mentioned embodiment is applicable to all electronic apparatuses that transmit power or signals. For example, the embodiment is applicable to apparatuses to be charged and including a secondary battery, such as a wristwatch, an electric toothbrush, an electric shaver, a cordless phone, a personal handy phone, a mobile personal computer, a PDA (personal digital assistants), and an electric bicycle, and chargers thereof.

Also, a coil unit to which the invention is applied is not limited to a spirally-wound, air-core coil and may be other various coils.

Figure 14:
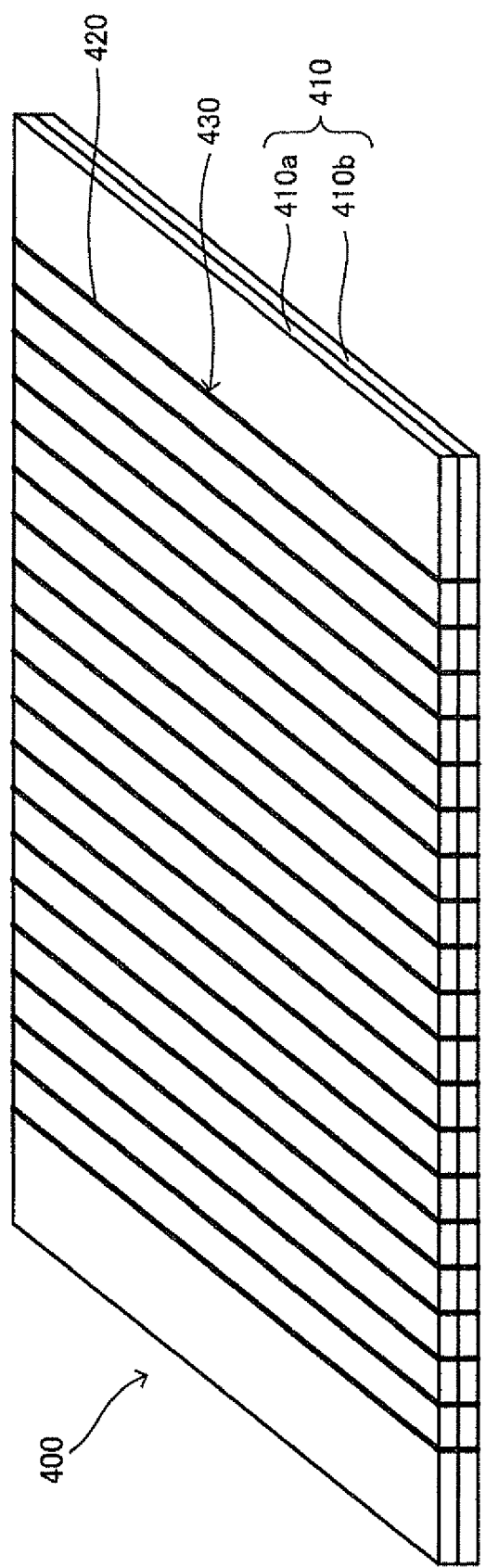
FIG. 14 is a schematic perspective view showing a main part of a modification of a coil unit.

FIG. 14 shows a coil unit 400 of a type different from that of the above-mentioned embodiment. For example, the coil unit 400 includes a coil 430 formed by wiring a coil wire 420 around a flat magnetic substance core 410 (for example, a multilayer body where a first magnetic substance 410a and a second magnetic substance 410b are layered). When an alternating current is passed through the coil wire 420 of the coil unit 400, a magnetic path is formed in the magnetic substance core 410 and magnetic flux lines are formed in parallel with the magnetic substance core 410. Even if the coil unit 400 is used as the primary coil L1 and/or secondary coil L2, contactless power transmission is achieved by magnetic coupling between the primary and secondary coils.

That is, the invention is not limited to a coil having a magnetic substance on a surface thereof and is applicable to a coil using a magnetic substance as the core thereof. Also, the combination of a coil and a magnetic substance for forming a magnetic path for the coil is not limited to the above-mentioned combination, and coils having other various shapes and magnetic substances having other various shapes may be combined.

Also, the structure of the primary coil unit 12 described above may be adopted as the secondary coil unit 22. Conversely, the structure adopted as the secondary coil unit 22 may be adopted as the primary coil unit 12.

Also, for example, the coil unit 22 may be configured as follows: the coil unit 22 is incorporated into a case 22A as shown by solid lines in FIG. 15; the external connection terminals 41 and 42 are exposed from the case 22A; and the coil unit 22 is detachable with respect to the electronic apparatus 20, for example, in an arrow direction shown in the drawing by means of slot-in, etc. like an SD card or the like. Since the coil unit 22 is slim as described above, the coil unit 22 maintains the sliminess even if it is incorporated into the case 22A. The cell phone 20 is provided with an insertion part 21 shown by dotted lines in FIG. 15. When inserting the coil unit 22, the external connection terminals 41 and 42 of the coil unit 22 are connected to main body terminals (in-insertion part terminals) 24 and 25 shown using dotted lines in FIG. 15. This allows preparing coil units 22 having different charging characteristics and selectively inserting an appropriate coil unit 22 into the electronic apparatus 20 so as to obtain the electronic apparatus 20 having a desired charging characteristic. As for a portable apparatus such as a cell phone, the coil unit 22 may be incorporated into a battery lid of the portable apparatus.

Figure 15:
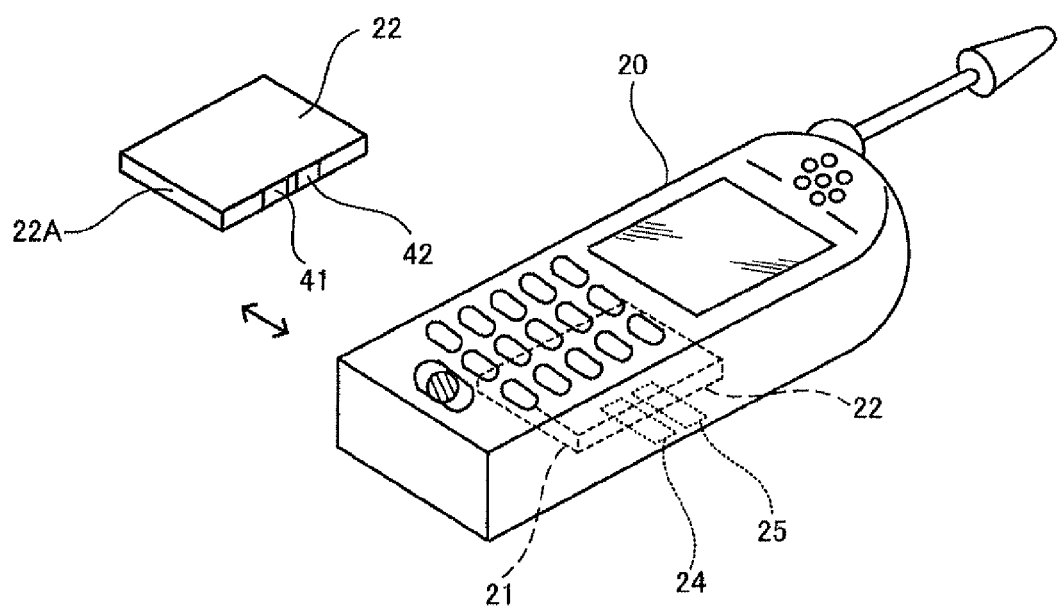
FIG. 15 is a drawing showing a modification where the secondary coil unit can be attached to or detached from an electronic apparatus.

Also, the detachable coil unit shown in FIG. 15 may be used as the primary coil unit 12.

What is claimed is:

1. A coil unit, comprising:
a coil formed by winding a coil wire, the coil having a transmission surface and a non-transmission surface;
a drawing line that is connected to the coil;
a wiring substrate, the wiring substrate having a coil housing that defines a coil housing hole, the coil being housed in the coil housing, and a drawing line hole adjacent to the coil housing hole, the drawing line extending through the drawing line hole;
a magnetic substance for receiving magnetic lines of force generated by the coil; and
a spacer that is disposed between the non-transmission surface of the coil and the magnetic substrate, the spacer having a notch that receives the drawing line.

2. The coil unit according to claim 1, the coil being a flat coil.

3. The coil unit according to claim 2,
the coil being an air core coil formed by winding the coil wire on a plane in a spiral fashion, the coil having an inner end, the inner end of the coil being drawn from the non-transmission surface of the coil.

4. The coil unit according to claim 1, the magnetic substance being a multilayer body where a plurality of magnetic substances are layered.

5. The coil unit according to claim 1, wherein the coil is in a first configuration in which the magnetic substance is a multilayer body, in which first and second magnetic substances having different magnetic permeabilities, wherein the coil in the first configuration has a first inductance and a first equivalent resistance.

6. The coil unit according to claim 5, wherein:
the coil would have a second inductance and second equivalent resistance in a second alternative configuration in which the first magnetic substance is disposed alone, the coil would have a third inductance and third equivalent resistance in a third alternative configuration in which the second magnetic substance is disposed alone, the second equivalent resistance is smaller than the third equivalent resistance, and the second inductance is smaller than the third inductance.

7. The coil unit according to claim 6, wherein a first Q value of the coil of the coil unit, defining a ratio of the first inductance to the first equivalent resistance, is larger than a second Q value, defining a ratio of the second inductance to the second equivalent resistance of the coil and is larger than a third Q value, defining a ratio of the third inductance to the third equivalent resistance.

8. The coil unit according to claim 7, the first magnetic substance being disposed between the coil wire and the second magnetic substance.

9. The coil unit according to claim 1, further comprising:

a temperature detection element; and a flexible substrate on which the temperature detection element being mounted, the flexible substrate being connected to the wiring substrate, wherein the flexible substrate being interposed between the coil wire and the magnetic substance.

10. An electronic apparatus comprising:

an insertion part into which the coil unit according to claim 1 is to be inserted; and a main body terminal to be connected to the external connection terminal of the coil unit.

11. The coil unit according to claim 1, the coil housing defining an aperture that receives the coil, the coil housing and the coil having substantially the same thickness such that an entire surface of the coil and the coil housing are flush with the spacer.

12. The coil unit according to claim 1, wherein the drawing line hole and the coil housing hole are formed in the same layer.

* * * * *